United States Patent Office 3,141,735
Patented July 21, 1964

3,141,735
PROCESS FOR PURIFYING LIQUID SULFUR DIOXIDE WITH BAUXITE
David George Young, Houston, Tex., assignor to Stauffer Chemical Company, New York, N.Y., a corporation of Delaware
No Drawing. Filed May 21, 1962, Ser. No. 196,482
2 Claims. (Cl. 23—178)

The present invention is concerned with a process for purifying liquid sulfur dioxide. In particular, it is concerned with the removal of sulfuric acid, which is present as an impurity in commercially available liquid sulfur dioxide. The process has the further advantages of also removing water and certain residual impurities which may be present, for example rust or other suspended particulate matter, and of causing little or no loss of sulfur dioxide.

According to the present invention, liquid sulfur dioxide is purified by contacting it with granular, calcined bauxite. Numerous other materials were investigated and found not to give the desirable results obtained with the granular, calcined bauxite. The present invention therefore unexpectedly provides an inexpensive and convenient method of treating large quantities of liquid sulfur dioxide and converting it to material of exceptional high purity. In this connection, it should be noted that commercially produced liquid sulfur dioxide contains sulfuric acid as an impurity. The source of this acid is not completely understood, and it may be due to carryover from the production processes, to oxidation of the sulfur dioxide, for example by nitrate impurities, or to other causes not recognized. For the purposes of the present invention, however, the source of the sulfuric acid impurities is not important.

It is a further advantage of the present invention that it may be utilized commercially to treat large quantities of liquid sulfur dioxide without the necessity for employing complicated or expensive apparatus. In fact any type of apparatus may be employed, as long as it is capable of keeping the liquid sulfur dioxide isolated from the atmosphere during the process. The most convenient method for large scale application of the process is simply to pass the liquid sulfur dioxide through a filter bed of granular, calcined bauxite. For example, the granular, calcined bauxite may be contained in a filter body made of four feet of 16" $\phi$ flanged pipe. The bottom blank may be fitted with a 2" diameter exit nipple and union; it may also have a 1" wide ring welded to its inner surface and of such diameter that it will fit inside the 16" pipe. Inside the ring are placed 1" high bars supporting the filter screens. 40 x 40 wire mesh is suitable and it is best supported and protected by 6 x 6 mesh wire on each side of it. The top of the 16" pipe will be blank and the $SO_2$ entrance may conveniently be a 2" pipe welded to the side. In practical use of an apparatus of this type, the bottom screen flange is bolted on and 220 lbs. of granular, calcined bauxite is added through the top. This gives a filter bed of 4.2 cu. ft. in volume, or about 3½ ft. in depth. This is sufficient bauxite to remove all the sulfuric acid impurities from 6,000 gallons of liquid $SO_2$ originally containing 100 parts per million of sulfuric acid. After using, the filter may be vented and blown out. The bottom can then be removed and the used bauxite falls out and may be removed by any convenient method. A typical steam trap filter may be used in the exit line for additional filtering. The pressure drop through such a filter apparatus will be approximately 7 lbs. per square inch, at a pump rate of 50 gallons per minute. Retention time is about 0.7 minute (neglecting bauxite volume).

The bauxite to be employed in the process is preferably stored in sealed containers as soon as it has been calcined and screened. It should be protected from exposure to air and moisture at all times, or else it may add water to the sulfur dioxide instead of reducing it. Even if the calcined bauxite is not anhydrous, however, it will still reduce the acid content. Both 40 x 20 mesh bauxite and 30 x 20 mesh may conveniently be employed, and the particular mesh of the bauxite is not critical as long as the bauxite bed does not provide too much flow resistance, and as long as the particles are not so small that they tend to wash out as dust. In practice, it may sometimes be observed that the very first material through a filter will wash out a little dust, but this difficulty is readily overcome simply by venting this small quantity.

After passage through a filter such as described above, cloudy, milky sulfur dioxide is converted to a clear water-like fluid, having outstandingly low sulfuric acid content.

The following example is given solely for the purpose of illustration and is not to be construed as a limitation of the present invention, many variations of which will occur to those skilled in the art without departing from the spirit or scope thereof.

*Example I*

The process of the present invention was applied to liquid sulfur dioxide that contained 56 parts per million (p.p.m.) residue, 41 p.p.m. sulfuric acid and 82 p.p.m. water. 17¼ tons of this sulfur dioxide was pumped through a bed of 10 x 30 mesh calcined Arkansas bauxite, 17.3" in diameter by 24.4" deep, at a rate of 30 gallons per minute. The resulting product averaged 13 p.p.m. residue, 0.3 p.p.m. sulfuric acid, and 38 p.p.m. water. Thus an unacceptable material was brought up to unusually high specifications. In this example, the bauxite absorbed 0.8% of its weight in sulfuric acid, 0.9% of its weight in water, and 0.8% of its weight in residue.

What is claimed is:

1. A process for removing sulfuric acid present as an impurity in liquid sulfur dioxide, said process comprising contacting the sulfur dioxide with granular, calcined bauxite.

2. A process for removing sulfuric acid present as an impurity in liquid sulfur dioxide, said process comprising passing the liquid sulfur dioxide through a filter bed of particles of calcined bauxite.

References Cited in the file of this patent
UNITED STATES PATENTS
2,204,543    Berl _____ June 18, 1940